United States Patent
Pike et al.

(10) Patent No.: US 12,293,211 B2
(45) Date of Patent: May 6, 2025

(54) DATA MANIPULATION DETECTION THROUGH A VERIFICATION OPERATING SYSTEM

(71) Applicant: Cyemptive Technologies, Inc., Snohomish, WA (US)

(72) Inventors: Robert Pike, Snohomish, WA (US); Stewart P. MacLeod, Woodinville, WA (US); Brian A. Jensen, Wilson, NC (US)

(73) Assignee: Cyemptive Technologies, Inc., Snohomish, WA (US)

(*) Notice: Subject to any disclaimer, the term of this patent is extended or adjusted under 35 U.S.C. 154(b) by 89 days.

(21) Appl. No.: 18/233,164

(22) Filed: Aug. 11, 2023

(65) Prior Publication Data

US 2024/0054224 A1    Feb. 15, 2024

Related U.S. Application Data

(60) Provisional application No. 63/397,695, filed on Aug. 12, 2022.

(51) Int. Cl.
| | | |
|---|---|---|
| *G06F 9/44* | (2018.01) | |
| *G06F 9/4401* | (2018.01) | |
| *G06F 9/455* | (2018.01) | |
| *G06F 21/57* | (2013.01) | |

(52) U.S. Cl.
CPC ........ *G06F 9/45558* (2013.01); *G06F 9/4406* (2013.01); *G06F 21/575* (2013.01); *G06F 2009/4557* (2013.01); *G06F 2009/45583* (2013.01); *G06F 2221/033* (2013.01)

(58) Field of Classification Search
CPC .. G06F 9/45558; G06F 9/4406; G06F 21/575; G06F 2009/4557; G06F 2009/45583; G06F 2221/033
See application file for complete search history.

(56) References Cited

U.S. PATENT DOCUMENTS

| | | |
|---|---|---|
| 7,974,416 B2 | 7/2011 | Zimmer et al. |
| 9,367,671 B1 | 6/2016 | Dobrovolskiy et al. |
| 2006/0010317 A1 | 1/2006 | Lee |

OTHER PUBLICATIONS

PCT International Search Report and Written Opinion, PCT Application No. PCT/US2023/30083, Nov. 14, 2023, 7 pages.

*Primary Examiner* — Zahid Choudhury (74) *Attorney, Agent, or Firm* — Fenwick & West LLP (57) ABSTRACT

A verification operating system (VOS) is an intermediary operating system that verifies data of a primary operating system before the primary operating system controls of the computing device. When the computing device is initialized, initial boot processes load the VOS instead of the primary operating system. The VOS performs verification processes on data storing the primary operating system to verify that the primary operating system has not been manipulated or corrupted before passing control of the computing device to the primary operating system. A VOS also may be used to verify an operating system used by a virtual machine (VM). The VOS verifies data storing a VM operating system to be used for requested VMs. If the VOS verifies that the VM OS data is accurate, the VOS provides the VM OS data to a hypervisor for use in a VM.

20 Claims, 4 Drawing Sheets

DATA MANIPULATION DETECTION THROUGH A VERIFICATION OPERATING SYSTEM

CROSS-REFERENCE TO RELATED APPLICATIONS

This application claims the benefit of U.S. Provisional Patent Application No. 63/397,695, entitled "Data Manipulation Detection through a Verification Operating System" and filed Aug. 12, 2022, which is incorporated herein by reference.

TECHNICAL FIELD

The disclosure relates to data manipulation detection through verification of operating system at initialization.

BACKGROUND

A computing device may use an operating system (OS) to manage hardware components of the computing devices. Operating systems also may provide an interface between the hardware components and applications operating on the computing devices. Modern operating systems can be complex software systems that provide many features to improve operation of the computing device. As operating systems become more complex, however, they also become more difficult to properly maintain by software developers. Thus, vulnerabilities within a complex operating system may be unnoticed or not addressed immediately. These vulnerabilities create opportunities for malicious actors to exploit, thereby compromising the security of the operating system. For example, an operating system has broad control over the functionality of the computing device and is therefore particularly attractive for a malicious actor to exploit and gain unauthorized access to or control of the computing device. Thus, conventional operating systems are frequently subjected to hacking attempts by malicious actors.

SUMMARY

A verification operating system (VOS) is an intermediary operating system that verifies data of a primary operating system before the primary operating system controls of the computing device. When the computing device is initialized, initial boot processes (e.g., basic input output system (BIOS) processes) load the VOS instead of the primary operating system. The VOS performs verification processes on data storing the primary operating system to verify that the primary operating system has not been manipulated or corrupted. For example, the VOS may use a parity bit, a checksum, or a cryptographic hash function or any combination of multiple functions to compare the data on the computing device storing the primary operating system with data storing an accurate version of the primary operating system. If the VOS determines that the primary operating system stored on the computing device is accurate, then the VOS passes control of the computing device to the primary operating system.

A VOS also may be used to verify an operating system used by a virtual machine (VM). An online VM system may receive instructions to initialize one or more VMs from a client device. The online VM system may allocate resources of the online VM system to the one or more VMs and may load a VOS onto the resources. The VOS verifies data storing a VM operating system to be used for the requested VMs. If the VOS verifies that the VM OS data is accurate, the VOS provides the VM OS data to a hypervisor for use in a VM. In some embodiments, the VOS generates a set of VM OS clones, which are duplicates of an instance of the VM OS to be used for a VM. In embodiments where multiple instances (e.g., 2 or more) of a VM OS are necessary (e.g., for a rolling security computing platform), the hypervisor can use the set of VM OS clones when rebuilding a VM within a server group.

By using a VOS as an intermediary operating system before passing control of a computing device to a primary operating system, the VOS can verify the accuracy of the primary operating system before the primary operating system controls the computing device. Thus, the primary operating system does not control the computing device if the primary operating system has not been verified. Accordingly, malicious actors cannot gain unauthorized access or control of the computing device by manipulating the primary operating system. Similarly, by loading a VOS onto the resources of an online VM system before loading the VM OS onto the resources, the VM OS is not loaded until after it has been verified by the VOS. Accordingly, a malicious actor is unable to exploit potential vulnerabilities in a primary operating system or a VM OS as they are unable to get access or control of a computing device or an online VM system.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Architecture

Figure 1:
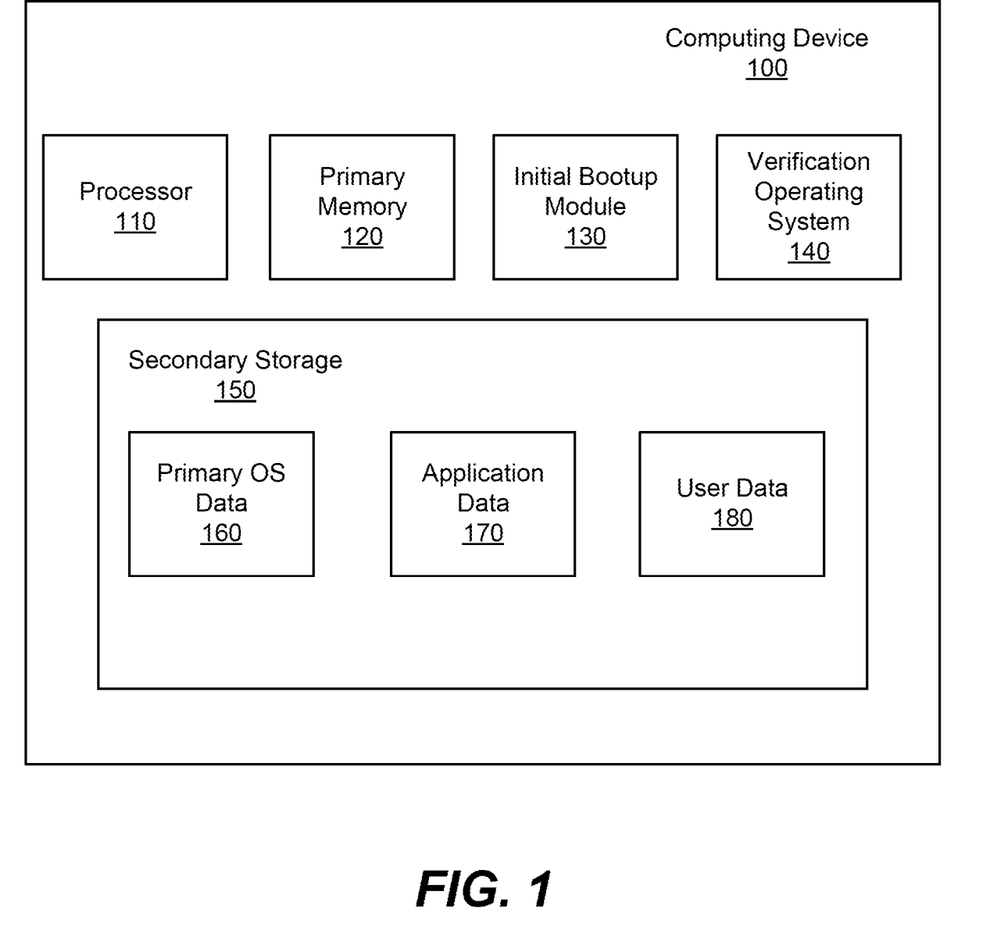
FIG. 1 illustrates an example system architecture of a computing device, in accordance with some embodiments.

FIG. 1 illustrates an example system architecture of a computing device 100, in accordance with some embodiments. The computing device 100 illustrated in FIG. 1 includes a processor 110, primary memory 120, an initial bootup module 130, a verification operating system (VOS) 140, and secondary storage 150. Alternative embodiments may include more, fewer, or different components from those illustrated in FIG. 1, e.g., a network interface. In addition, the functionality of each component may be divided between the components differently from the description below. Additionally, each component may perform their respective functionalities in response to a request from a human, or automatically without human intervention.

The computing device 100 is a device that is capable of performing computational functions for a user. For example, the computing device 100 may be a desktop computer, a laptop computer, a server, a smartphone, or a tablet. In addition to those components illustrated in FIG. 1, the computing device 100 may include other components that perform additional functionalities. For example, the computing device 100 may include one or more communication components that allow the computing device 100 to communicate with other devices, such as a network card that allows the computing device 100 to communicate with devices over a network (e.g., the Internet). The computing device 100 may include or be coupled to one or more user interface components, such as a display, a mouse, a keyboard, a touch screen, or a track pad.

The processor 110 is one or more computing processors (generally, a processor or processing unit) that perform computations for the computing device 100. For example, the processor 110 may include a central processing unit, a graphics processing unit, a vision processing unit, a tensor processing unit, a neural processing unit, a field-programmable gate array, a quantum processing unit, a controller, a state machine, and/or a microprocessor. In some embodiments, the processor 110 includes one or more memories (generally, a memory) that stores data being used by the processor 110. For example, the processor 110 may include registers or cache memory.

The primary memory 120 is memory that is directly accessible by the processor 110. The primary memory 120 may include volatile memory, such as static random-access memory (SRAM) or dynamic random-access memory (DRAM), or may include non-volatile memory, such as read-only memory (ROM).

The initial bootup module 130 performs one or more initial boot processes to boot the computing device 100. An initial boot process is an initialization process that is performed when the computing device 100 before control of the computing device 100 is passed to an operating system. For example, the initial bootup module 130 may include a Basic Input/Output System (BIOS) and an initial boot process may include a process performed by the BIOS to boot the computing device 100. In some embodiments, the instructions for initial boot processes performed by the initial bootup module 130 are stored in a ROM in primary memory 120. The initial book processes may include processes by which the secondary storage 150 is decrypted. For example, the secondary storage 150 may apply one or more levels of encryption to the data stored on the secondary storage 150, and the initial bootup module 130 may decrypt the data stored on the secondary storage 150.

The initial bootup module 130 may perform initial boot processes upon receiving a boot input signal. A boot input signal is a signal that instructs the initial bootup module 130 to start the operation of the computing device 100. For example, the boot input signal may be a cold boot signal generated when the computing device 100 has been powered on, or may be a warm boot signal generated when the computing device 100 has restarted without an interruption of power to the computing device 100. In some embodiments, the boot input signal is generated when a power switch of the computing device 100 is activated by a user. For example, the boot input signal may be generated after the computing device 100 is powered off for a configurable set of time for the power cycle to drain any capacitor cache and enable a new power cycle based on a time event. The delayed power cycle ensures that any temporary changes are not carried over from a previous boot cycle.

The initial bootup module 130 may perform initial boot processes that verify that hardware on the computing device 100 is functioning properly and to startup components of the computing device 100, such as the processor 110 and the primary memory 120. The initial bootup module 130 may then perform a bootloader process that loads an OS from secondary storage 150. In some embodiments, the secondary storage 150 contains its own encryption and authentication processes to unlock access to a drive, partition, virtual drive or other elements that store the VOS 140. The bootloader process loads a VOS 140, and passes control of the computing device 100 to the VOS 140.

The VOS 140 controls the computing device 100 as an intermediary step between initial boot processes performed by the initial bootup module 130 and when a primary OS controls the computing device 100. The VOS 140 is an operating system that performs verification processes on data stored in secondary storage 150 before a primary OS controls the computing device 100. A VOS 140 may include a kernel that handles control of hardware components of the computing device 100. A VOS 140 also may include higher level functionality, such as user accounts and application interfaces. The VOS 140 may be stored in secondary storage 150 or may be stored in a ROM in primary memory 120.

A verification process performed by the VOS 140 is a process that confirms that data stored by secondary storage 150 has not be manipulated or corrupted. For example, the verification process may use a single or multiple combinations of the parity bit, checksum, or cryptographic hashes, other cryptographic elements, malware, stegonagraphy, system functions like the clocks, custom hardware signing or more to verify data stored by secondary storage 150. In some embodiments, a verification process compares data stored by secondary storage 150 to known accurate data. Additionally, a verification process may include one or more steps performed at a server with which the VOS 140 communicates. For example, the VOS may transmit data from secondary storage 150 to a remote server to be verified. The VOS 140 may then receive a response from the server that indicates whether the data is accurate or whether there are any errors with the transmitted data. In some embodiments, the VOS 140 verifies data stored by the primary memory 120 or on external storage.

The VOS 140 verifies that the primary OS data 160 stored in secondary storage 150 is accurate. Primary OS data 160 is the data that makes up the primary operating system. The primary OS is the operating system that the computing device 100 uses during normal operation. For example, the primary OS may include Windows, MacOS, Linux, iOS, Android, or ChromeOS. The primary OS data may include executables, source code, machine code, or other files that implement the functionality of the primary OS. The primary OS data 160 may comprise a set of files or a set of data blocks stored in secondary storage 150.

In some embodiments, the VOS 140 verifies application data 170 stored by secondary storage 150. Application data 170 is data that makes up applications that operate on the computing device 100. For example, the application data 170 may include executables, source code, machine code, or other files that implement applications that operate on the computing device 100. The application data 170 may comprise a set of files or a set of data blocks stored in secondary storage 150.

In some embodiments, the VOS 140 verifies user data 180 stored by secondary storage 150. User data 180 is data stored on the computing device 100 by the user. For example, the user data 180 may include documents, photos, or videos stored in secondary storage 150. The user data 180 may comprise a set of files or a set of data blocks stored in secondary storage 150.

If the VOS 140 verifies that the data stored in secondary storage 150 is accurate, the VOS 140 loads the primary OS into primary memory and passes control of the computing device 100 to the primary OS. For example, the VOS 140 may load instructions for bootstrapping the primary OS from a location in secondary storage 150 where the VOS 140 had stored the instructions. Upon passing control of the computing device to the primary OS, the VOS 140 may cease operation or may perform some background processes.

If the VOS 140 detects that the data stored in secondary storage 150 is not accurate (e.g., has been manipulated or corrupted), the VOS 140 may perform one or more failure handling processes to rectify the inaccuracy or minimize any impact caused by the inaccuracy. For example, the VOS 140 may not load the primary OS or pass control to the primary OS to the computing device 100. The VOS 140 may fix or attempt to fix the inaccuracy in the data or may replace the data with a version of the data that is known to be accurate. For example, if the VOS 140 determines that there is an inaccuracy in the primary OS data 160, the VOS 140 may reinstall the primary OS onto the computing device 100. Similarly, the VOS 140 may replace data blocks or files stored on secondary storage 150 based on data blocks or files in a known good state. If the VOS 140 analyzes and determines that the inaccurate data stems from manipulation by a malicious actor or by corruption of the data, the primary OS will not be loaded. The VOS 140 further may generate a notification that the data in secondary storage 150 could not be verified and/or the primary OS is not loaded. Additionally, if the VOS determines that there is an inaccuracy in data stored in secondary storage 150, the VOS 140 may delete data on the secondary storage 150 to prevent access to that data by potentially malicious actors.

Figure 2:
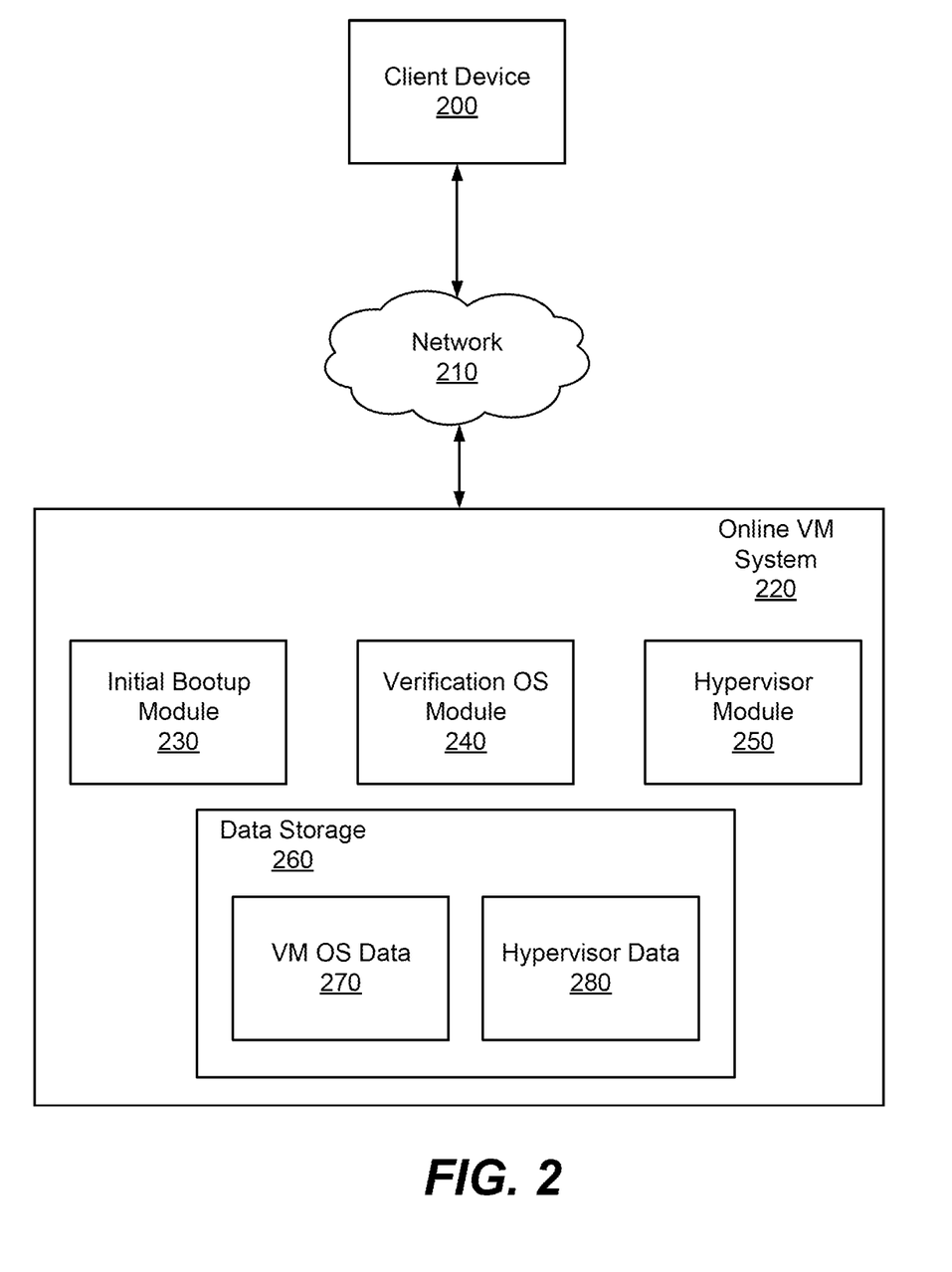
FIG. 2 illustrates an example system environment for an online VM system, in accordance with some embodiments.

FIG. 2 illustrates an example system environment for an online VM system 220, in accordance with some embodiments. The system environment illustrated in FIG. 2 includes a client device 200, a network 210, and an online VM system 220. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

A user can interact with the online VM system 220 through a client device 200. The client device 200 can be a personal or mobile computing device, such as a smartphone, a tablet, a laptop computer, or a desktop computer. In some embodiments, the client device 200 is a similar device to the computing device 100 illustrated in FIG. 1. The client device 200 may execute a client application that uses an application programming interface (API) to communicate with the online VM system 220 through the network 210.

The client device 200 may send initialization instructions to the online VM system 220 to generate a virtual machine (VM). The initialization instructions may specify resources (e.g., processing power, primary memory, secondary storage, networking bandwidth) required for the VM, how long the VM should operate for, what type of operating system the VM should use, and what applications should be available on the VM. The client device 200 also may include an interface that the user can use to interact with a VM on the online VM system 220. In some embodiments, the client device 200 is an AI controlled system that communicates with the online VM system 220.

The client device 200 may communicate with the online VM system 220 via the network 210. The network 210 may be a local area and/or wide area networks employing wired and/or wireless communication links. In some embodiments, the network 210 uses standard communications technologies and protocols. For example, the network 210 includes communication links using technologies such as Ethernet, Fiberchannel, 802.11, worldwide interoperability for microwave access (WiMAX), 3G, 4G, code division multiple access (CDMA), digital subscriber line (DSL), etc. Examples of networking protocols used for communicating via the network 210 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 210 may be represented using any format, such as hypertext markup language (HTML) or extensible markup language (XML). In some embodiments, all or some of the communication links of the network 210 may be encrypted.

FIG. 2 also illustrates an example system architecture of an online VM system 220, in accordance with some embodiments. The VM system is built on a computing device architecture that includes one or more processors, memories, storage devices, and network connection. The online VM system 220 illustrated in FIG. 2 includes an initial bootup module 230, a verification OS module 240, a hypervisor (or virtual machine monitor) module 250, and a data storage 260. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The initial bootup module 230 receives initialization instructions from the client device 200 and begins the process for initializing VMs on the online VM system 220. For example, the initial bootup module 230 may identify physical resources of the online VM system 220 to be used for VMs requested by the client device 200. The initial bootup module 230 may pass control of the identified resources to the verification OS module 240. Additionally, the initial bootup module 230 may use encryption keys, authentication processes, password verification processes or file fingerprinting to authenticate the client device 200.

The verification OS module 240 loads a VOS onto the VM resources to verify data stored in the data storage 260 before passing control of the resources to a hypervisor of a VM OS. The verification OS module 240 may use one instance of a VOS to control the identified VM resources for multiple eventual VMs or may use one VOS instance for each eventual VM. The VOS used by the verification OS module 240 may include some or all of the functionalities of the VOS 140 described in FIG. 1.

The VOS used by the verification OS module 240 performs one or more verification processes on the data stored in the data storage 260. For example, the VOS may verify VM OS data 270 stored in the data storage 260. VM OS data 270 is data that makes up one or more operating systems that may be used during normal operation of virtual machines on the online VM system 220. For example, the VM OS data 270 may include executables, source code, machine code, or other files that implement the functionality of operating systems that may be used for VMs. In some embodiments, the VOS verifies application data and/or user data stored on the online VM system 220.

If the verification OS module 240 verifies the VM OS data 270, the verification OS module 240 may generate a set of OS clones based on the verified OS. An OS clones is an instance of a VM OS that have been cloned based on verified VM OS data 270. Each OS clone may be generated to operate on a particular VM using particular resources in the online VM system 220. In some embodiments, each OS clone is encrypted such that the OS clone can only be operated on a particular VM. The OS clones may be used by a rolling security platform for rebuilding VMs operating in a sever group. U.S. Pat. No. 9,906,530, entitled "Rolling Security Platform," contains more information on rolling security platforms, the contents of which are incorporated herein by reference.

The VOS may also verify hypervisor data 280 stored in the data storage 260. Hypervisor data 280 is data that makes up a hypervisor used by the online VM system 220 to manage VMs. For example, the hypervisor data 280 may include executables, source code, machine code, or other files that implement the functionality of a hypervisor on the online VM system 220. The VOS may provide verified hypervisor data 280 to the hypervisor module 250 to be used for a hypervisor for VMs. In some embodiments, the VOS provides a set of OS clones to the hypervisor module 250 to use for a VM.

The hypervisor module 250 uses one or more hypervisors to create and operate VMs. Hypervisors may manage the allocation of physical resources to VMs on the online VM system 220 and may provide an interface between physical resources and VMs. The hypervisors also may provide an interface between VMs and client devices 200 that requested the VMs. In some embodiments, hypervisors use OS clones provided by the verification OS module 240 to initialize and rebuild VMs (e.g., when using a rolling security platform, for example, as described in U.S. Pat. No. 9,906,530, entitled "Rolling Security Platform" and filed Sep. 17, 2015, which is incorporated by reference herein). For example, the hypervisors may use an OS clone to build new VM sessions when a previous VM session is being shut down.

Figure 3:
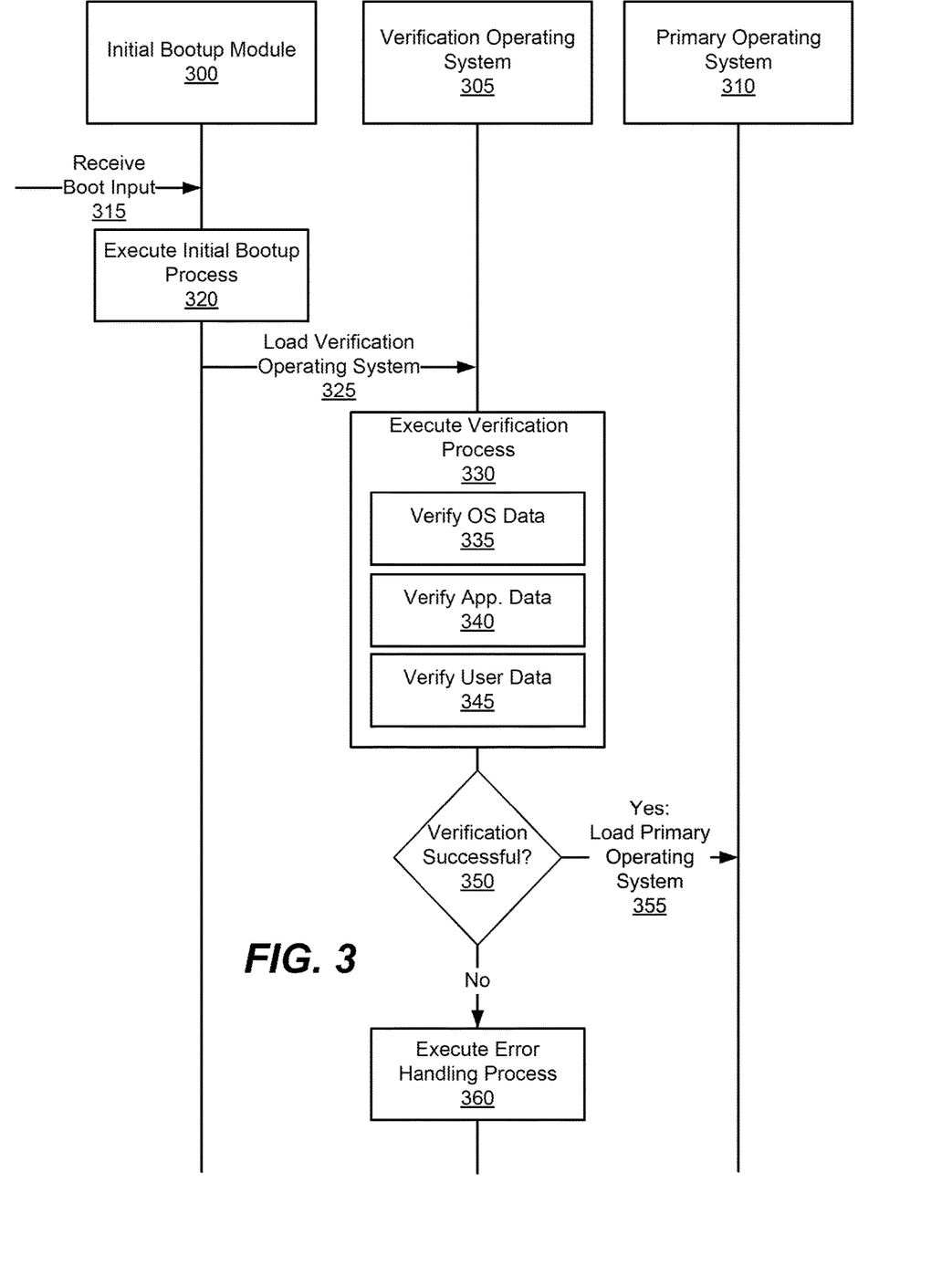
FIG. 3 is an interaction diagram for an example process (or method) of using a verification operating system in the bootup process of a computing device, in accordance with some embodiments.

FIG. 3 is an interaction diagram for an example process (or method) of using a verification operating system in the bootup process of a computing device, in accordance with some embodiments. Alternative embodiments may include more, fewer, or different steps from those illustrated in FIG. 3, and the steps may be performed in a different order from that illustrated in FIG. 3. Additionally, each of these steps may be performed automatically by a computing device without human intervention.

The initial bootup module 300 of the computing device receives 315 a boot input signal that instructs the initial bootup module 300 to start operation of the computing device. For example, the boot input signal may be a cold boot signal indicating that the computing device has been powered on, or may be a warm boot signal indicating that the computing device has restarted without an interruption of power to the computing device.

The initial boot module 300 executes 320 one or more initial bootup processes to boot the computing device. For example, the initial bootup module 300 may perform one or more processes that are performed by a BIOS of the initial bootup module 300. Upon completion of the initial bootup processes, the initial bootup module 300 loads 325 the verification operating system 305. In some embodiments, loading 325 the verification operating system 305 includes passing control of the computing device to the verification operating system 305.

The verification operating system 305 executes 330 one or more verification processes on data stored on the computing device, e.g., computing device 100. The verification operating system 305 may execute 330 the verification process over a set of data blocks stored on secondary storage of the computing device or on a set of files stored in secondary storage of the computing device. The verification operating system 305 verifies primary OS data 335 stored by the computing device. In some embodiments, the verification operating system 305 verifies 340 application data stored on the computing device. The verification operating system 305 also may verify user data 345 stored on the computing device.

If the verification operating system 305 successfully verifies 350 that the data stored on the computing device has not been manipulated or corrupted, then the verification operating system 305 loads 355 the primary operating system 310. In some embodiments, loading 355 the primary operating system 310 includes passing control of the computing device to the primary operating system 310. If the verification operating system 305 determines that the data stored on the computing device has been manipulated or corrupted, then the verification operating system 305 executes 360 a failure handling process. For example, the verification operating system 305 may notify a user of the manipulated or corrupted data and may prevent loading the primary operating system 310 or it may attempt to fix the manipulated or corrupted data and, if fixed, load the primary operating system 310 and if not fixed it would not load the primary operating system 310.

Figure 4:
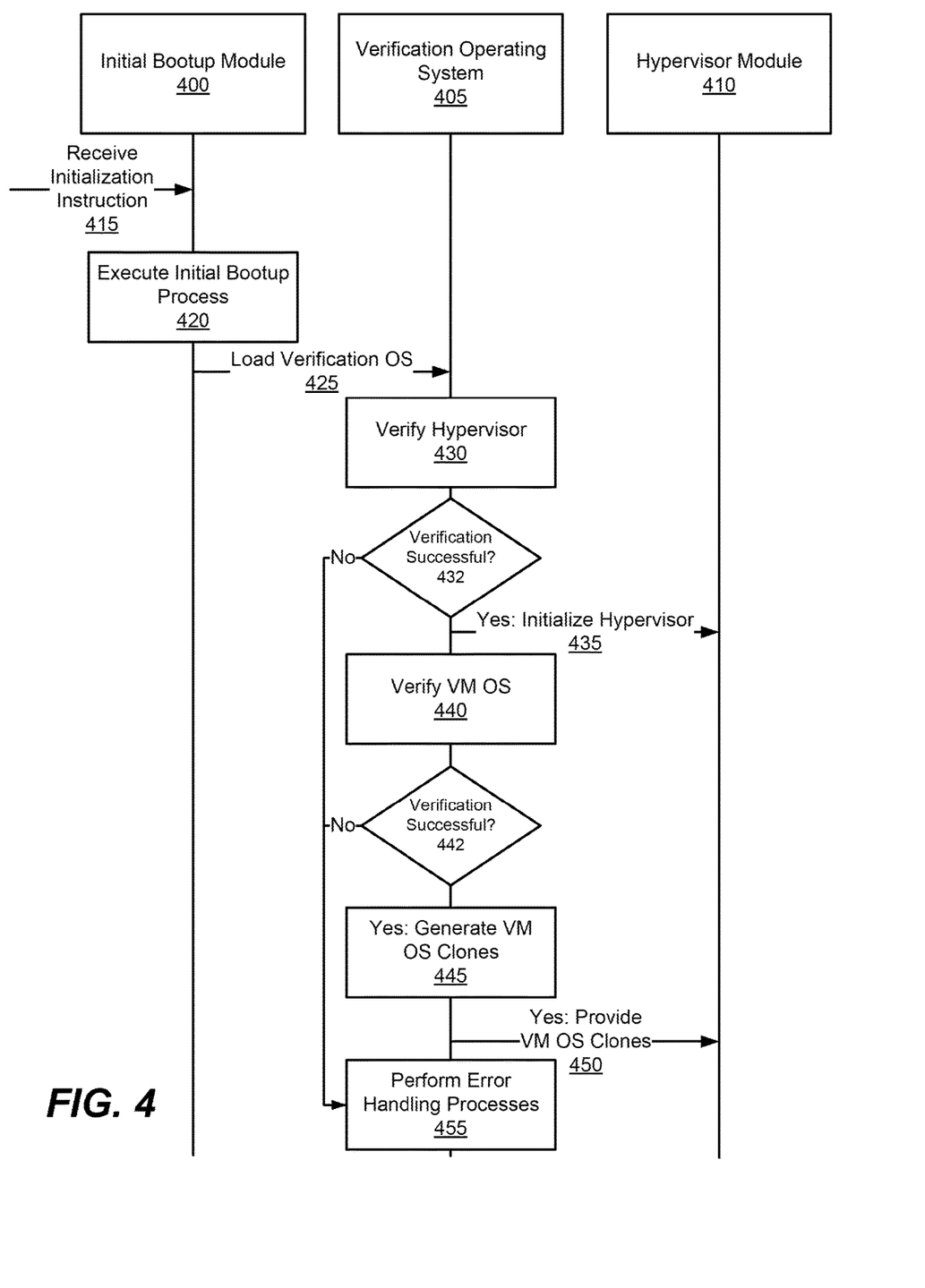
FIG. 4 is an interaction diagram for an example process of using a verification operating system to verify an operating system used by a virtual machine, in accordance with some embodiments.

FIG. 4 is an interaction diagram for an example process (or method) of using a verification operating system to verify an operating system used by a virtual machine, e.g., online virtual machine system 220, in accordance with some embodiments. Alternative embodiments may include more, fewer, or different steps from those illustrated in FIG. 4, and the steps may be performed in a different order from that illustrated in FIG. 4. Additionally, each of these steps may be performed automatically by an online system without human intervention.

An initial bootup module 400 of an online VM system receives 415 initialization instructions from a client device. The initialization instructions are instructions to initialize one or more VMs on the online VM system. The initialization instructions may include instructions on how many VMs to initialize, which kinds of resources the VM should have available to it, how long the VM should operate for, what type of operating system the VM should use, or what applications should be available on the VM. The initial bootup module 400 executes 420 an initial bootup process (e.g., identifying physical resources of the online VM system to use for the VM) and loads 425 the verification operating system 405. In some embodiments, loading 425 the verification operating system 405 includes passing control of physical resources identified by the initial bootup module 400 to the verification operating system 405.

The verification operating system 405 verifies 430 hypervisor data stored in a data storage of the online VM system. If the verification operating system 405 successfully verifies 432 that the hypervisor data has not been manipulated or corrupted, the verification operating system 405 initializes 435 a hypervisor based on the hypervisor data. The verification operating system 405 verifies 440 VM OS data for an operating system to be used by the VMs requested by the client device. If the verification operating system verifies 442 that the VM OS data has not been manipulated or corrupted, the verification operating system 405 then generates 445 a set of VM OS clones based on the verified VM OS data and provides 450 the VM OS clones to the hypervisor.

The verification operating system 405 may perform 455 error handling processes if the verification operating system 405 does not successfully verify 432 the hypervisor data and/or does not successfully verify 442 the VM OS data. For example, the verification operating system 405 may attempt to fix the hypervisor data and/or the VM OS data to remedy inaccuracies from the possible manipulation or corruption of the hypervisor data and/or VM OS data. If the verification operating system 405 can fix the hypervisor data and/or the VM OS data, the verification operating system 405 may initialize 435 the hypervisor and provide 450 the VM OS clones to the hypervisor module 410. In some embodiments, the verification operating system 405 attempts to replace the hypervisor data and/or the VM OS data with a version of the data that is known to be accurate. Additionally, the verification operating system 405 may not initialize 435 the hypervisor and/or may not generate 445 the VM OS clones. The verification operating system 405 may notify a user that the hypervisor data and/or the VM OS data may have been manipulated or corrupted.

Similar techniques to those described above may be used for verifying data for bare metal servers, embedded operating systems, or online containers. For example, for bare metal servers, a server may perform the process illustrated in FIG. 3 or may verify a hypervisor and an operating system for the bare metal server as illustrated in FIG. 4. Similarly, for containers, an online system may verify a hypervisor that manages containers for the online system, e.g., as described in FIG. 4, and may verify data stored by the container, e.g., as described in FIG. 3. For embedded operating systems, a system may perform the method similar to that illustrated in FIG. 3.

ADDITIONAL CONSIDERATIONS

By using a VOS as an intermediary operating system before passing control of a computing device to a primary operating system, the VOS can ensure that the primary operating system has not been manipulated or corrupted in such a way that a user's personal data may be at risk of being stolen by malicious actors. Furthermore, by loading the VOS onto the resources of an online VM system before loading the VM OS onto the resources, the VM OS is not loading until it has been verified by the VOS. Thus, the VOS addresses the longstanding issue of data security on personal computing devices and for online systems.

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

What is claimed is:

1. A non-transitory computer-readable medium comprising stored instructions that, when executed by a processor, cause the processor to:
   receive, at an online system, virtual machine initialization instructions from a client device operated by a user, the virtual machine initialization instructions comprising instructions from the client device to initialize one or more virtual machines on the online system;
   execute, upon receipt of the virtual machine initialization instructions, one or more initial bootup processes on the online system, the one or more initial bootup processes identifying one or more resources of the online system to be used by a verification operating system;
   load a verification operating system onto the one or more resources of the online system;
   verify, by the verification operating system, a set of data stored by the online system, the set of data comprising data storing a virtual machine operating system for the one or more virtual machines;
   generate, upon verification of the set of data, one or more virtual machine operating system instances for the one or more virtual machines based on the set of data;
   generate the one or more virtual machines based on the one or more virtual machine operating system instances; and
   transmit, to the client device, a confirmation that the one or more virtual machines have been generated.

2. The non-transitory computer-readable medium of claim 1, wherein the set of data further comprises data storing an application on the online system.

3. The non-transitory computer-readable medium of claim 1, wherein the set of data further comprises data storing user data.

4. The non-transitory computer-readable medium of claim 1, wherein the virtual machine initialization instructions identify the virtual machine operating system as an operating system to use for the one or more virtual machines.

5. The non-transitory computer-readable medium of claim 1, further comprising instructions that, when executed by the processor, cause the processor to:
   verify, by the verification operating system, hypervisor data storing a hypervisor; and
   generate, upon verification of the hypervisor data, a hypervisor for managing the one or more virtual machines.

6. The non-transitory computer-readable medium of claim 1, further comprising instructions that, when executed by a processor, cause the processor to:
   generate, for each virtual machine of the one or more virtual machines, a plurality of virtual machine operating system clones, where each virtual machine operating system clone of the plurality of virtual machine operating system clones comprise a virtual machine operating system instance that is configured to operate for the one or more virtual machines.

7. The non-transitory computer-readable medium of claim 6, further comprising instructions that, when executed by the processor, cause the processor to:
   encrypt, for each virtual machine of the one or more virtual machines, each virtual machine operating system clone of the plurality of virtual machine operating system clones associated with the one or more virtual machines.

8. A system comprising:
   a processor; and
   a non-transitory computer-readable medium comprising stored instructions that, when executed by a processor, cause the processor to:
      receive, at an online system, virtual machine initialization instructions from a client device operated by a user, the virtual machine initialization instructions comprising instructions from the client device to initialize one or more virtual machines on the online system;
      execute, upon receipt of the virtual machine initialization instructions, one or more initial bootup processes on the online system, the one or more initial bootup processes identifying one or more resources of the online system to be used by a verification operating system;
      load a verification operating system onto the one or more resources of the online system;
      verify, by the verification operating system, a set of data stored by the online system, the set of data comprising data storing a virtual machine operating system for the one or more virtual machines;
      generate, upon verification of the set of data, one or more virtual machine operating system instances for the one or more virtual machines based on the set of data;
      generate the one or more virtual machines based on the one or more virtual machine operating system instances; and
      transmit, to the client device, a confirmation that the one or more virtual machines have been generated.

9. The system of claim 8, wherein the set of data further comprises data storing an application on the online system.

10. The system of claim 8, wherein the set of data further comprises data storing user data.

11. The system of claim 8, wherein the virtual machine initialization instructions identify the virtual machine operating system as an operating system to use for the one or more virtual machines.

12. The system of claim 8, wherein the computer-readable medium further comprises stored instructions that, when executed by the processor, cause the processor to:
   verify, by the verification operating system, hypervisor data storing a hypervisor; and
   generate, upon verification of the hypervisor data, a hypervisor for managing the one or more virtual machines.

13. The system of claim 8, wherein the computer-readable medium further comprises stored instructions that, when executed by the processor, cause the processor to:
   generate, for each virtual machine of the one or more virtual machines, a plurality of virtual machine operating system clones, where each virtual machine operating system clone of the plurality of virtual machine operating system clones comprise a virtual machine operating system instance that is configured to operate for the one or more virtual machines.

14. The system of claim 13, wherein the computer-readable medium further comprises stored instructions that, when executed by the processor, cause the processor to:
   encrypt, for each virtual machine of the one or more virtual machines, each virtual machine operating system clone of the plurality of virtual machine operating system clones associated with the one or more virtual machines.

15. A method comprising:
   receiving, at an online system, virtual machine initialization instructions from a client device operated by a user, the virtual machine initialization instructions comprising instructions from the client device to initialize one or more virtual machines on the online system;
   executing, upon receipt of the virtual machine initialization instructions, one or more initial bootup processes on the online system, the one or more initial bootup processes identifying one or more resources of the online system to be used by a verification operating system;
   loading a verification operating system onto the one or more resources of the online system;
   verifying, by the verification operating system, a set of data stored by the online system, the set of data comprising data storing a virtual machine operating system for the one or more virtual machines;
   generating, upon verification of the set of data, one or more virtual machine operating system instances for the one or more virtual machines based on the set of data;
   generating the one or more virtual machines based on the one or more virtual machine operating system instances; and
   transmitting, to the client device, a confirmation that the one or more virtual machines have been generated.

16. The method of claim 15, wherein the set of data further comprises data storing an application on the online system.

17. The method of claim 15, wherein the set of data further comprises data storing user data.

18. The method of claim 15, further comprising:
   verifying, by the verification operating system, hypervisor data storing a hypervisor; and
   generating, upon verification of the hypervisor data, a hypervisor for managing the one or more virtual machines.

19. The method of claim 15, further comprising:
   generating, for each virtual machine of the one or more virtual machines, a plurality of virtual machine operating system clones, where each virtual machine operating system clone of the plurality of virtual machine operating system clones comprise a virtual machine operating system instance that is configured to operate for the one or more virtual machines.

20. The method of claim 19, further comprising:
   encrypting, for each virtual machine of the one or more virtual machines, each virtual machine operating system clone of the plurality of virtual machine operating system clones associated with the one or more virtual machines.

* * * * *